United States Patent
Tachibanada et al.

(10) Patent No.: US 11,919,506 B2
(45) Date of Patent: Mar. 5, 2024

(54) VEHICLE

(71) Applicant: HONDA MOTOR CO., LTD., Tokyo (JP)

(72) Inventors: Yuya Tachibanada, Tokyo (JP); Shintaro Kameda, Tokyo (JP); Tetsuya Matsumoto, Tokyo (JP); Shinobu Kurachi, Tokyo (JP); Sadahito Kajihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/576,508

(22) Filed: Jan. 14, 2022

(65) Prior Publication Data

US 2022/0227352 A1   Jul. 21, 2022

(30) Foreign Application Priority Data

Jan. 18, 2021   (JP) ................................ 2021-006002

(51) Int. Cl.
*B60K 6/38*   (2007.10)
*B60K 6/48*   (2007.10)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC ........ Y02T 10/62; Y02T 10/40; B60W 20/00; B60W 20/40; B60W 20/10; B60W 10/026;
(Continued)

(56) References Cited

U.S. PATENT DOCUMENTS

2012/0290151 A1*  11/2012  Bissontz .............. B60W 10/30
                                                 180/65.265
2013/0218432 A1*   8/2013  Kudo .................... F02N 15/027
                                                 701/67
(Continued)

FOREIGN PATENT DOCUMENTS

CN   103826949 B   *   8/2016
CN   107310371 A   *  11/2017
(Continued)

OTHER PUBLICATIONS

CN103826949 B—English translation (Year: 2016).*

*Primary Examiner* — George C Jin
*Assistant Examiner* — Teuta B Holbrook
(74) *Attorney, Agent, or Firm* — Paratus Law Group, PLLC (57) ABSTRACT

A vehicle includes: an internal combustion engine; a rotary electric machine; a connection-disconnection device; a hydraulic pressure supply device; a hydraulic pressure control device; and a control device. The hydraulic pressure supply device includes a mechanical hydraulic pressure supply device and a pressure accumulator. The control device executes fuel cut-off control to stop fuel supply to the internal combustion engine and rotation speed maintaining control to maintain a rotation speed of the internal combustion engine at a predetermined rotation speed by rotationally driving the internal combustion engine by the rotary electric machine or supplying fuel to the internal combustion engine. The hydraulic pressure control device supplies the hydraulic pressure to the connection-disconnection device by the pressure accumulator when the hydraulic pressure supplied to the connection-disconnection device by the mechanical hydraulic pressure supply device is less than a predeter- (Continued)

mined value when an acceleration command is given to the vehicle.

6 Claims, 6 Drawing Sheets (51) Int. Cl.
*B60W 10/02* (2006.01)
*B60W 10/06* (2006.01)
*B60W 10/08* (2006.01)
*B60W 20/40* (2016.01)

(52) U.S. Cl.
CPC ..... *B60W 10/08* (2013.01); *B60K 2006/4825* (2013.01); *B60W 2710/0644* (2013.01); *B60W 2710/081* (2013.01)

(58) Field of Classification Search
CPC ........... B60W 10/024; B60W 10/0235; B60W 10/023; B60W 10/02; B60W 2030/18081; B60W 2030/1809; B60W 30/18127; B60W 2710/02; B60W 2710/0644; B60W 2710/065; B60W 2710/0655; B60W 2710/0661

See application file for complete search history.

(56) References Cited

U.S. PATENT DOCUMENTS

| | | | |
|---|---|---|---|
| 2019/0136970 A1* | 5/2019 | Takahashi | ............... F02D 29/02 |
| 2020/0238994 A1 | 7/2020 | Yanagisawa et al. | |
| 2020/0292015 A1* | 9/2020 | Matsuda | ............... B60W 10/02 |

FOREIGN PATENT DOCUMENTS

| CN | 109927703 A | * | 6/2019 |
|---|---|---|---|
| CN | 111942161 A | * | 11/2020 |
| CN | 212313284 U | * | 1/2021 |
| JP | 2006170399 A | * | 6/2006 |
| JP | 2017145958 A | * | 8/2017 |
| JP | 6502692 B2 | * | 4/2019 |
| JP | 6521019 B2 | | 5/2019 |

* cited by examiner

VEHICLE

CROSS-REFERENCE TO RELATED APPLICATIONS

The present application claims the benefit of priority of Japanese Patent Application No. 2021-006002, filed on Jan. 18, 2021, the content of which is incorporated herein by reference.

TECHNICAL FIELD

The present invention relates to a vehicle.

BACKGROUND ART

There is a vehicle including, in a power transmission path between an engine and a drive wheel, a connection-disconnection device (for example, a clutch) capable of connecting and disconnecting the power transmission path. Such a connection-disconnection device is configured to be capable of connecting the power transmission path by, for example, being supplied with hydraulic pressure by a mechanical oil pump driven by rotation (operation) of the engine.

However, in recent years, a vehicle may stop supply of fuel to the engine to stop rotation of the engine during deceleration or stop of the vehicle from the viewpoint of improving fuel efficiency. When the rotation of the engine is stopped, the mechanical oil pump driven by the rotation of the engine is also stopped. Therefore, the mechanical oil pump cannot supply the necessary hydraulic pressure to the connection-disconnection device capable of connecting and disconnecting the power transmission path between the engine and the drive wheel, and thus a response performance of the vehicle to an acceleration command (or a start command) or the like may decrease.

Therefore, Japanese Patent No. 6521019 discloses a technique in which an electric oil pump is provided in addition to the mechanical oil pump, and hydraulic pressure of the electric oil pump is used when the necessary hydraulic pressure cannot be secured by the mechanical oil pump.

However, in the related art described above, the hydraulic pressure of the electric oil pump is used when the necessary hydraulic pressure cannot be secured by the mechanical oil pump. Therefore, it is necessary to provide the electric oil pump in addition to the mechanical oil pump, which may complicate a configuration of a vehicle. In addition, in the related art described above, when a state where the necessary hydraulic pressure cannot be secured by the mechanical oil pump continues for a long time, it is necessary to drive the electric oil pump during that time, and thus electric power consumption of the vehicle may increase.

SUMMARY

The present invention provides a vehicle capable of preventing a decrease in response performance to an acceleration command given to the vehicle with a simple configuration.

According to an aspect of the present invention, there is provided a vehicle including: an internal combustion engine; a rotary electric machine configured to rotationally drive the internal combustion engine; a connection-disconnection device provided to connect and disconnect a power transmission path between the internal combustion engine and a drive wheel, the connection-disconnection device being configured to connect the power transmission path in response to supply of hydraulic pressure equal to or higher than a predetermined value; a hydraulic pressure supply device configured to supply hydraulic pressure to the connection-disconnection device; a hydraulic pressure control device configured to control the supply of the hydraulic pressure supplied by the hydraulic pressure supply device to the connection-disconnection device; and a control device configured to control the internal combustion engine and the rotary electric machine, where: the hydraulic pressure supply device includes: a mechanical hydraulic pressure supply device that is driven in accordance with rotation of the internal combustion engine to supply the hydraulic pressure to the connection-disconnection device; and a pressure accumulator configured to supply the hydraulic pressure to the connection-disconnection device by pressure accumulated in advance, the control device executes: fuel cut-off control to stop fuel supply to the internal combustion engine based on a deceleration command given to the vehicle; and rotation speed maintaining control to maintain a rotation speed of the internal combustion engine at a predetermined rotation speed larger than 0 by rotationally driving the internal combustion engine by the rotary electric machine or supplying fuel to the internal combustion engine when the rotation speed of the internal combustion engine decreases to a predetermined rotation speed along with the execution of the fuel cut-off control; and the hydraulic pressure control device supplies the hydraulic pressure to the connection-disconnection device by the pressure accumulator when the hydraulic pressure supplied to the connection-disconnection device by the mechanical hydraulic pressure supply device is less than the predetermined value when an acceleration command is given to the vehicle.

According to the present invention, it is possible to provide a vehicle capable of preventing a decrease in response performance to an acceleration command given to the vehicle with a simple configuration.

DESCRIPTION OF EMBODIMENTS

Hereinafter, an embodiment of a vehicle of the present invention will be described in detail with reference to the drawings.

(Configuration of Vehicle)

Figure 1:
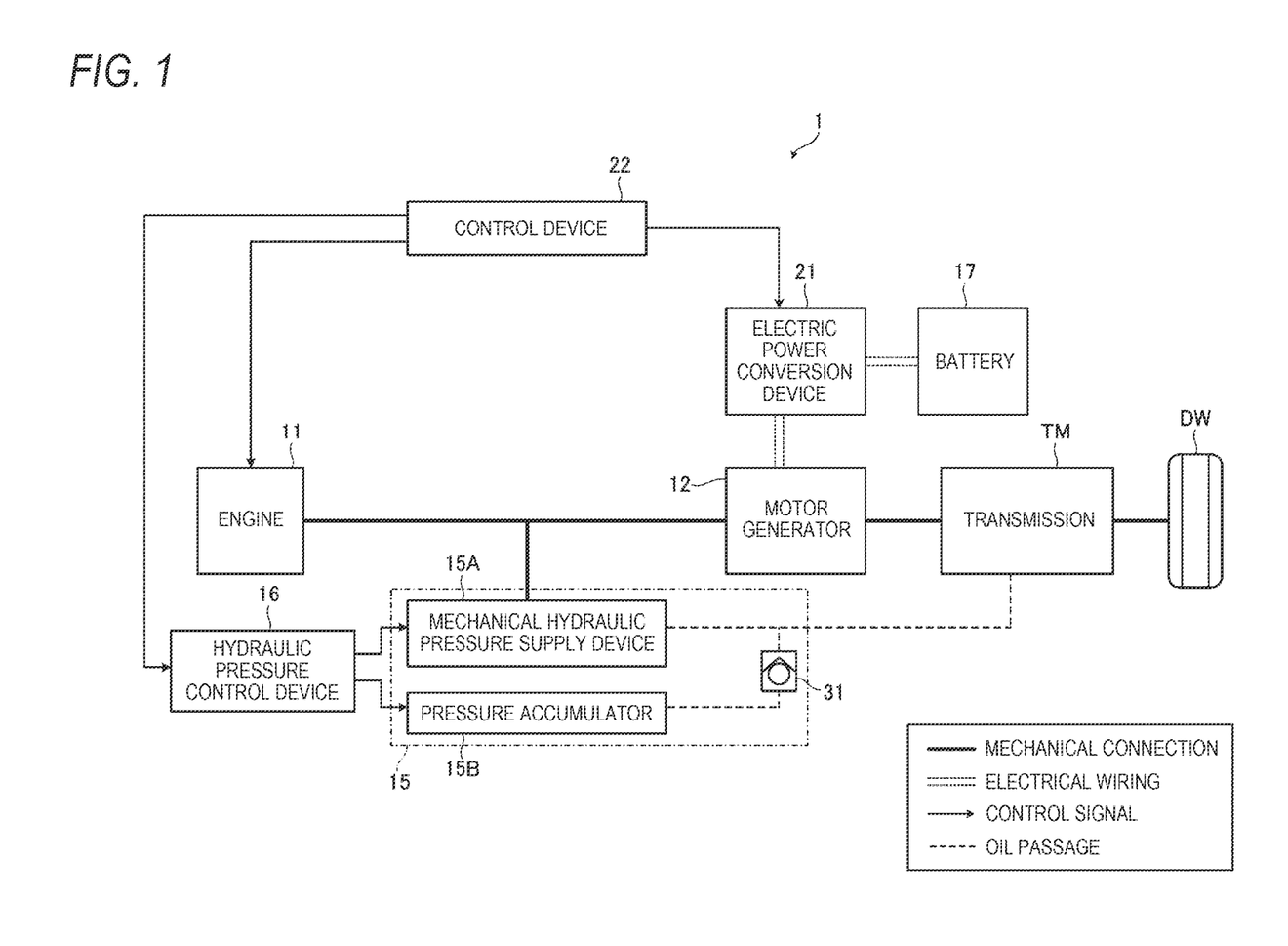
FIG. 1 shows an example of a partial configuration of a vehicle according to an embodiment of the present invention.

As shown in FIG. 1, a vehicle 1 of the present embodiment is a so-called hybrid electrical vehicle that includes an engine 11, a motor generator 12, a transmission TM, a hydraulic pressure supply device 15, a hydraulic pressure control device 16, a battery 17, an electric power conversion device 21, a control device 22, and a drive wheel DW. In FIG. 1, a thick solid line indicates mechanical connection, a double broken line indicates electrical wiring, a solid line arrow mark indicates a control signal, and a broken line indicates an oil passage.

The engine 11 is rotationally driven by being supplied with fuel (for example, gasoline). Power output from the engine 11 (hereinafter, also simply referred to as the output of the engine 11) is transmitted to the drive wheel DW via the transmission TM that is mechanically connected to the engine 11, and is used for traveling of the vehicle 1. The engine 11 is also mechanically connected to the motor generator 12. Therefore, the motor generator 12 can be rotationally driven by the output of the engine 11, while the engine 11 can also be rotationally driven by power output from the motor generator 12 (hereinafter, also simply referred to as the output of the motor generator 12).

The engine 11 is also mechanically connected to a mechanical hydraulic pressure supply device 15A, which will be described later, included in the hydraulic pressure supply device 15. When the engine 11 is rotationally driven, the mechanical hydraulic pressure supply device 15A is also driven.

The motor generator 12 is, for example, a three-phase AC motor, and functions as a motor that outputs power by being supplied with electric power. The motor generator 12 is electrically connected to the battery 17 via the electric power conversion device 21.

Here, the battery 17 is, for example, a battery that includes a plurality of power storage cells connected in series and is configured to be capable of outputting a high voltage of 100 to 400 [V]. As each power storage cell of the battery 17, a lithium ion battery, a nickel hydrogen battery, or the like can be used. The electric power conversion device 21 includes an inverter, a DC/DC converter, and the like, and is a device that is controlled by the control device 22 to perform electric power conversion. For example, the electric power conversion device 21 converts DC power supplied from the battery 17 into three-phase AC power and supplies the three-phase AC power to the motor generator 12, or converts three-phase AC power supplied from the motor generator 12 into DC power and supplies the DC power to the battery 17.

The motor generator 12 is supplied with electric power from the battery 17 via the electric power conversion device 21, thereby rotationally driving the engine 11. When the motor generator 12 rotationally drives the engine 11, as will be described later, a rotation speed of the engine 11 can be maintained at a predetermined rotation speed (for example, a rotation speed N1 described later) larger than 0 [rpm] even when fuel supply to the engine 11 is stopped due to execution of fuel cut-off control. The output of the motor generator 12 may be transmitted to the drive wheel DW via the transmission TM so as to be used for traveling of the vehicle 1.

The motor generator 12 also functions as a generator that generates electric power by being rotationally driven. The motor generator 12 is rotationally driven by the engine 11 that is rotationally driven in accordance with fuel supply, and is also rotationally driven by power input from the drive wheel DW in accordance with braking or the like of the vehicle 1. The electric power generated by the motor generator 12 is supplied to the battery 17 via the electric power conversion device 21, and is used to charge the battery 17.

Figure 2:
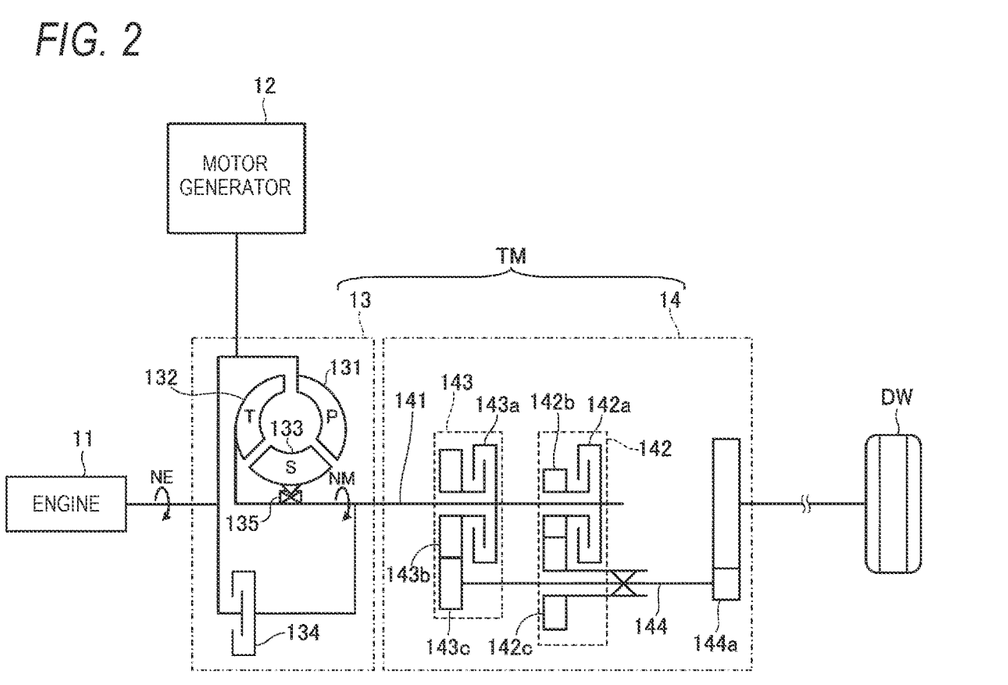
FIG. 2 shows an example of a schematic configuration of a transmission included in the vehicle according to the embodiment of the present invention.

The transmission TM is a multistage transmission having a plurality of gear stages (for example, seven stages), and is provided in a power transmission path from the engine 11 to the drive wheel DW. As an example, as shown in FIG. 2, the transmission TM includes a torque converter 13 and a gearbox 14.

The torque converter 13 includes a pump impeller 131, a turbine runner 132, a stator 133, and a lock-up clutch 134. The pump impeller 131 is mechanically connected to the engine 11 and the motor generator 12, and rotates integrally along with rotational driving of the engine 11 and the motor generator 12. The turbine runner 132 includes a hydraulic oil inflow port disposed close to a hydraulic oil discharge port of the pump impeller 131. The turbine runner 132 is mechanically connected to an input shaft 141 of the gearbox 14 and rotates integrally with the input shaft 141. The stator 133 is interposed between the turbine runner 132 and the pump impeller 131, and deflects a flow of hydraulic oil returning from the turbine runner 132 to the pump impeller 131. The stator 133 is supported by a housing (not shown) or the like of the torque converter 13 via a one-way clutch 135. The torque converter 13 can transmit power (rotational power) from the pump impeller 131 to the turbine runner 132 via the hydraulic oil by circulating the hydraulic oil in a circulation path formed between the pump impeller 131 and the turbine runner 132.

The lock-up clutch 134 is a clutch capable of mechanically connecting and disconnecting the engine 11 to and from the input shaft 141 of the gearbox 14. By bringing the lock-up clutch 134 into an engaged state, the output of the engine 11 can be directly transmitted to the input shaft 141 of the gearbox 14. That is, when the lock-up clutch 134 is in the engaged state, the engine 11 (more precisely, an output shaft of the engine 11) and the input shaft 141 of the gearbox 14 rotate integrally.

The gearbox 14 includes the input shaft 141 to which the output of the engine 11 and the motor generator 12 is transmitted via the torque converter 13, a plurality of transmission mechanisms capable of shifting power transmitted to the input shaft 141, and an output member 144 including an output gear 144a that outputs the power shifted by any one of the plurality of transmission mechanisms toward the drive wheel DW.

The plurality of transmission mechanisms included in the gearbox 14 include a first transmission mechanism 142 and a second transmission mechanism 143. The first transmission mechanism 142 includes a first transmission clutch 142a, a first drive gear 142b that rotates integrally with the input shaft 141 when the first transmission clutch 142a is in an engaged state, and a first driven gear 142c that rotates integrally with the output member 144. The second transmission mechanism 143 includes a second transmission clutch 143a, a second drive gear 143b that rotates integrally with the input shaft 141 when the second transmission clutch 143a is in an engaged state, and a second driven gear 143c that rotates integrally with the output member 144. The clutches provided in the transmission mechanisms included in the gearbox 14 (that is, the transmission TM), namely the first transmission clutch 142a and the second transmission clutch 143a, are hereinafter also referred to as the transmission clutch.

Although only the first transmission mechanism 142 and the second transmission mechanism 143 are shown in FIG. 2 as the transmission mechanisms included in the gearbox 14, the gearbox 14 also includes, for example, a transmission mechanism (not shown) other than the first transmission mechanism 142 and the second transmission mechanism 143.

Whether each clutch included in the transmission TM, namely the lock-up clutch 134, the first transmission clutch 142a, and the second transmission clutch 143a (hereinafter, also simply referred to as the clutch of the transmission TM), is in an engaged state or a released state is controlled by the control device 22. The clutch of the transmission TM is operated by hydraulic pressure of hydraulic oil supplied from the hydraulic pressure supply device 15 to the transmission TM. For example, the clutch of the transmission TM can be brought into the engaged state when hydraulic pressure equal to or higher than a predetermined value (for example, hydraulic pressure P1 to be described later) is supplied to the transmission TM by the hydraulic pressure supply device 15, and thus the power transmission path from the engine 11 to the drive wheels DW can be connected.

Referring back to FIG. 1, the hydraulic pressure supply device 15 is controlled by the hydraulic pressure control device 16 to supply the hydraulic pressure to the transmission TM. Specifically, the hydraulic pressure supply device 15 includes the mechanical hydraulic pressure supply device 15A, a pressure accumulator 15B, and a check valve 31.

The mechanical hydraulic pressure supply device 15A is a so-called mechanical oil pump, and is configured to be capable of being driven in accordance with rotation of the engine 11 to supply the hydraulic pressure to the transmission TM. That is, the mechanical hydraulic pressure supply device 15A can supply the hydraulic pressure to the transmission TM when the engine 11 rotates, and, on the other hand, cannot supply the hydraulic pressure to the transmission TM when the engine 11 does not rotate. Even when the engine 11 rotates, the mechanical hydraulic pressure supply device 15A cannot supply the transmission TM with hydraulic pressure necessary for bringing the clutch of the transmission TM into the engaged state when the rotation speed of the engine 11 is low. In other words, when the rotation speed of the engine 11 is less than a predetermined rotation speed (for example, the rotation speed N1 described later), the mechanical hydraulic pressure supply device 15A cannot supply the transmission TM with hydraulic pressure necessary to connect the power transmission path from the engine 11 to the drive wheel DW. The hydraulic pressure supplied to the transmission TM by the mechanical hydraulic pressure supply device 15A is hereinafter also referred to as the line pressure.

The pressure accumulator 15B is an accumulator capable of accumulating pressure of hydraulic oil introduced into the pressure accumulator 15B, and is configured to be capable of supplying the accumulated hydraulic pressure (hereinafter, also referred to as the accumulated pressure) to the transmission TM. For example, the pressure accumulator 15B is connected to a branch oil passage branched from an oil passage connecting the mechanical hydraulic pressure supply device 15A and the transmission TM (for example, the clutch of the transmission TM) via the check valve 31.

When the line pressure supplied by the mechanical hydraulic pressure supply device 15A is higher than the accumulated pressure, a part of hydraulic oil flowing through the oil passage connecting the mechanical hydraulic pressure supply device 15A and the transmission TM is introduced into the pressure accumulator 15B via the check valve 31. Even when the line pressure supplied by the mechanical hydraulic pressure supply device 15A is equal to or lower than the accumulated pressure, the check valve 31 prevents the hydraulic oil introduced into the pressure accumulator 15B from returning to the oil passage connecting the mechanical hydraulic pressure supply device 15A and the transmission TM, and thus the accumulated pressure is maintained.

The check valve 31 can also be forcibly opened by an actuator or the like controlled by the hydraulic pressure control device 16. Therefore, for example, by opening the check valve 31 when the line pressure is not raised due to stop of the engine 11 or the like, the hydraulic oil introduced into the pressure accumulator 15B can be discharged to the oil passage connecting the mechanical hydraulic pressure supply device 15A and the transmission TM, and thus the accumulated pressure can be supplied to the transmission TM. It should be noted that the check valve 31 can be achieved by, for example, one or a plurality of one-way valves.

The hydraulic pressure control device 16 is configured to be capable of communicating with the control device 22 and the hydraulic pressure supply device 15. The hydraulic pressure control device 16 controls supply of hydraulic pressure supplied to the transmission TM by the hydraulic pressure supply device 15 based on information from the control device 22. The hydraulic pressure control device 16 is achieved by, for example, an electronic control unit (ECU) including a processor that performs various types of calculation, a storage device that stores various types of information, an input-output device that controls input and output of data between inside and outside of the hydraulic pressure control device 16, and the like.

For example, the hydraulic pressure control device 16 opens the check valve 31 when an acceleration command is given to the vehicle 1. As a result, the hydraulic pressure (accumulated pressure) accumulated in the pressure accumulator 15B can be supplied to the transmission TM as described above. The acceleration command given to the vehicle 1 may include, for example, accelerator-ON of the vehicle 1 and brake-OFF of the vehicle 1. Here, the accelerator-ON refers to a state where an amount of operation performed on an accelerator pedal of the vehicle 1 is equal to or higher than a predetermined amount (for example, a state where the accelerator pedal is depressed), and the brake-OFF refers to a state where an amount of operation performed on a brake pedal of the vehicle 1 is less than a predetermined amount (for example, a state where the brake pedal is not depressed).

More specifically, when an acceleration command is given to the vehicle 1, if the hydraulic pressure (line pressure) supplied to the transmission TM by the mechanical hydraulic pressure supply device 15A is less than a predetermined value necessary for bringing the clutch of the transmission TM into the engaged state, the hydraulic pressure control device 16 opens the check valve 31 and causes the pressure accumulator 15B to supply the hydraulic pressure to the transmission TM. As a result, the hydraulic pressure supplied to the transmission TM can be secured, and the clutch of the transmission TM can be brought into the engaged state, that is, the power transmission path from the engine 11 to the drive wheel DW can be connected.

The control device 22 is a device that controls the engine 11, the transmission TM, the electric power conversion device 21, the hydraulic pressure control device 16, and the like, and is achieved by, for example, an ECU including a processor that performs various types of calculation, a storage device that stores various types of information, an input-output device that controls input and output of data between inside and outside of the control device 22, and the like.

Various sensors (not shown) are connected to the control device 22. The control device 22 controls the engine 11, the transmission TM, the electric power conversion device 21, the hydraulic pressure control device 16, and the like based on information input from the various sensors. Examples of the sensors connected to the control device 22 include a rotation speed sensor that detects the rotation speed of the engine 11, a vehicle speed sensor that detects a speed of the vehicle 1 (hereinafter, also referred to as the vehicle speed), a brake pedal sensor that detects ON and OFF of the brake, an accelerator pedal sensor that detects ON and OFF of the accelerator, a gear position sensor that detects the gear stage of the transmission TM, a battery sensor that detects output of the battery 17, and the like. Further, a hydraulic pressure sensor that detects the hydraulic pressure supplied to the transmission TM by the hydraulic pressure control device 16 may be connected to the control device 22. The control device 22 may notify the hydraulic pressure control device 16 of the hydraulic pressure detected by the hydraulic pressure sensor. In addition, the control device 22 may instruct the hydraulic pressure control device 16 to open the pressure accumulator 15B, for example, based on the hydraulic pressure detected by the hydraulic pressure sensor.

For example, when a deceleration command is given to the vehicle 1 while the vehicle 1 is traveling, the control device 22 executes fuel cut-off control to stop the fuel supply to the engine 11. The deceleration command given to the vehicle 1 may include, for example, accelerator-OFF of the vehicle 1 and brake-ON of the vehicle 1. Here, the accelerator-OFF refers to a state where the amount of operation performed on the accelerator pedal of the vehicle 1 is less than a predetermined amount (for example, a state where the accelerator pedal is not depressed), and the brake-ON refers to a state where the amount of operation performed on the brake pedal of the vehicle 1 is equal to or higher than a predetermined amount (for example, a state where the brake pedal is depressed).

The control device 22 may execute the fuel cut-off control when the deceleration command is given to the vehicle 1 and a predetermined execution condition of the fuel cut-off control is satisfied. When the vehicle 1 decelerates and the vehicle speed becomes equal to or lower than a predetermined speed (for example, 10 [km/h]), the control device 22 may stop the engine 11 at that time.

When the rotation speed of the engine 11 decreases to a predetermined rotation speed along with the execution of the fuel cut-off control, the control device 22 executes rotation speed maintaining control to maintain the rotation speed of the engine 11 at a predetermined rotation speed (for example, the rotation speed N1 described later) larger than 0 [rpm]. During the rotation speed maintaining control, the control device 22 maintains the rotation speed of the engine 11 at the predetermined rotation speed, for example, by rotationally driving the engine 11 by the motor generator 12. During the rotation speed maintaining control, the control device 22 may also maintain the rotation speed of the engine 11 at the predetermined rotation speed by supplying fuel to the engine 11. The control device 22 maintains the rotation speed of the engine 11 at the predetermined rotation speed by performing the rotation speed maintaining control until a predetermined condition is satisfied, such as when the vehicle speed is equal to or less than a threshold value (for example, 5 [km/h]).

When the acceleration command is given to the vehicle 1, the control device 22 notifies the hydraulic pressure control device 16 of the acceleration command. The hydraulic pressure control device 16 that has received the notification of the acceleration command from the control device 22 can cause the pressure accumulator 15B to supply the hydraulic pressure to the transmission TM by opening the check valve 31 as described above.

Operation Example of Vehicle

Next, operation examples of the vehicle 1 will be described with reference to FIGS. 3 to 6.

First Example

Figure 3:
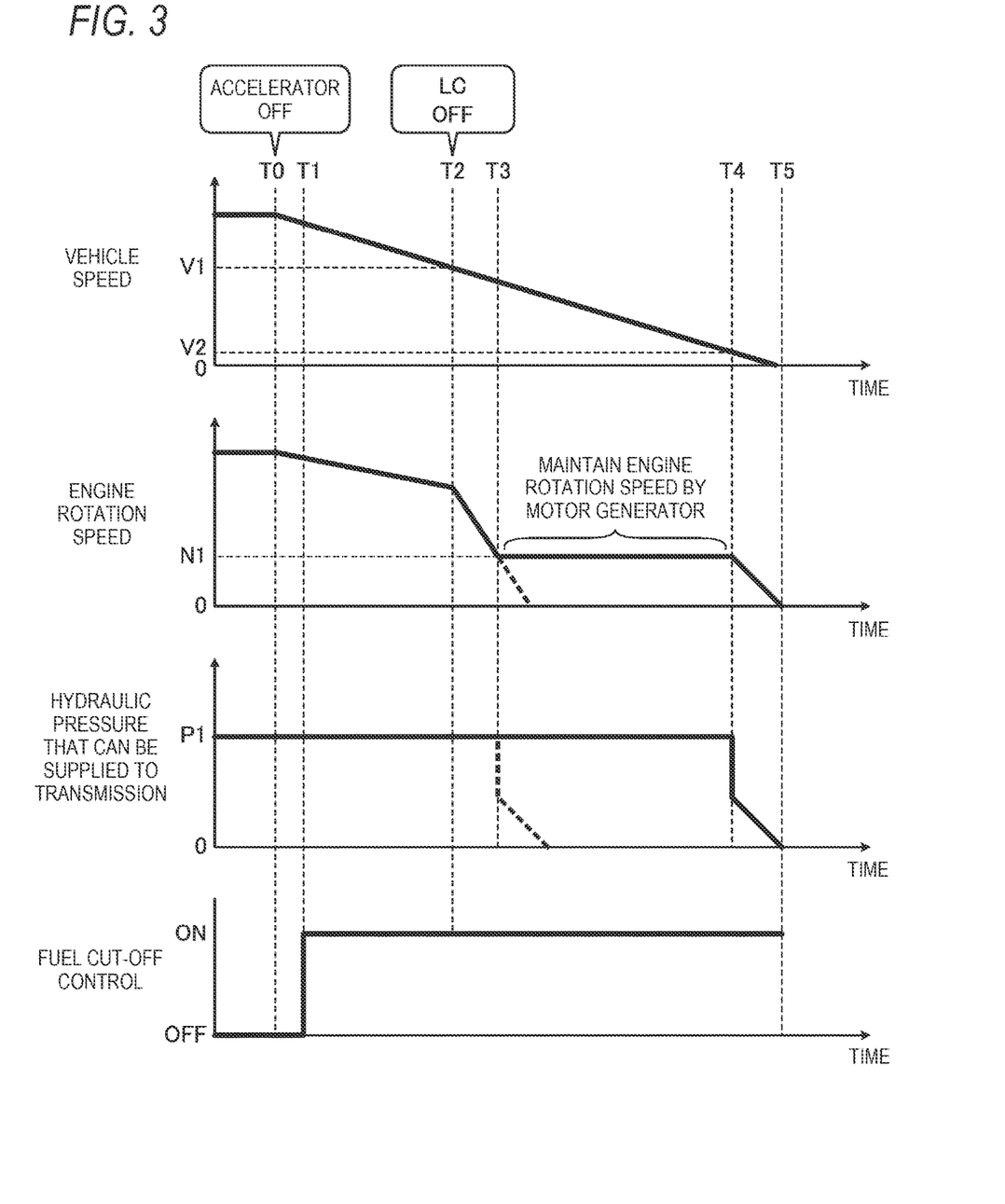
FIG. 3 is a timing chart showing a first example of an operation of the vehicle according to the embodiment of the present invention.

First, a first example of an operation of the vehicle 1 will be described with reference to FIG. 3. As shown in FIG. 3, it is assumed that any one of the transmission clutches and the lock-up clutch 134 of the transmission TM is in the engaged state, and the accelerator is turned off at a time T0 when the vehicle 1 is traveling (that is, vehicle speed>0). Then, it is assumed that a predetermined execution condition of the fuel cut-off control is satisfied at a time T1 after the time T0. In this case, the control device 22 starts the fuel cut-off control from the time T1.

When the lock-up clutch 134 is in the engaged state, the engine 11 is mechanically connected to the drive wheel DW via the transmission TM. Therefore, when the lock-up clutch 134 is in the engaged state and the vehicle 1 is traveling at a certain vehicle speed, even if the fuel cut-off control is executed, the engine 11 can be rotationally driven by power from the side of the drive wheel DW. It is also possible to supply predetermined hydraulic pressure P1 to the transmission TM by the line pressure of the mechanical hydraulic pressure supply device 15A along with the rotational driving of the engine 11. Here, the hydraulic pressure P1 is hydraulic pressure necessary for bringing the clutch of the transmission TM (for example, the transmission clutches) into the engaged state.

On the other hand, when the vehicle speed decreases while the lock-up clutch 134 is in the engaged state (that is, when the power transmitted from the side of the drive wheel DW to the engine 11 decreases), a stall of the engine (hereinafter, also referred to as the engine stall) may occur. Therefore, from the viewpoint of engine stall prevention, when the control device 22 detects that the vehicle speed reaches a predetermined speed V1 (speed V1>0) based on the information from the vehicle speed sensor during the fuel cut-off control, the control device 22 brings the lock-up clutch 134 into the released state. In the example shown in FIG. 3, at a time T2 after the time T1, since the control device 22 detects that the vehicle speed has reached the speed V1, the control device 22 brings the lock-up clutch 134 into the released state (shown as "LCOFF").

When the lock-up clutch 134 is in the released state, the power from the side of the drive wheel DW is not transmitted to the engine 11, and thus the rotation speed of the engine 11 decreases. If nothing is performed in this state, the rotation of the engine 11 is stopped. Therefore, when the control device 22 detects that the rotation speed of the engine 11 has decreased to the rotation speed N1 based on the information from the rotation speed sensor after the lock-up clutch 134 is brought into the released state, the control device 22 executes the rotation speed maintaining control to maintain the rotation speed of the engine 11 at the rotation speed N1.

During the rotation speed maintaining control, the control device 22 supplies, for example, electric power of the battery 17 to the motor generator 12 to rotationally drive the engine 11 by the motor generator 12. At this time, the control device 22 controls driving of the motor generator 12 via the electric power conversion device 21 in such a manner that the rotation speed of the engine 11 is maintained at the rotation speed N1.

In the example shown in FIG. 3, at a time T3 after the time T2, the control device 22 detects that the rotation speed of the engine 11 has reached the rotation speed N1, and thus starts to rotationally drive the engine 11 by the motor generator 12 and maintains the rotation speed of the engine 11 at the rotation speed N1. Here, the rotation speed N1 is the rotation speed of the engine 11 at which the hydraulic pressure P1 described above can be secured as the line pressure of the mechanical hydraulic pressure supply device 15A.

In this way, the control device 22 can maintain the rotation speed of the engine 11 at the rotation speed N1 by the rotation speed maintaining control, and thus supply the hydraulic pressure P1 to the transmission TM by the line pressure of the mechanical hydraulic pressure supply device 15A.

Thereafter, the control device 22 executes the rotation speed maintaining control until the vehicle speed reaches a predetermined speed V2 (speed V2<speed V1). Here, the speed V2 is a speed immediately before the vehicle 1 stops (that is, a speed at which the vehicle 1 is expected to stop soon), and may be, for example, 5 [km/h]. As a result, the rotation speed of the engine 11 is maintained at the rotation speed N1 until the vehicle speed reaches the speed V2 (that is, until immediately before the vehicle 1 stops).

Then, when the vehicle speed reaches the speed V2, the control device 22 ends the rotation speed maintaining control. In the example shown in FIG. 3, since the vehicle speed reaches the speed V2 at a time T4 after the time T3, the control device 22 ends the rotation speed maintaining control (here, the rotational driving of the engine 11 driven by the motor generator 12) at that time.

When the rotation speed maintaining control is ended in this way, the rotation speed of the engine 11 decreases toward 0 [rpm] since the fuel cut-off control is being executed. In the example shown in FIG. 3, at a time T5 after the time T4, the rotation speed of the engine 11 becomes 0 [rpm].

In addition, when the rotation speed maintaining control is ended and the rotation speed of the engine 11 becomes lower than the rotation speed N1, the line pressure supplied by the mechanical hydraulic pressure supply device 15A also decreases. As a result, the hydraulic pressure that can be supplied to the clutch of the transmission TM also decreases toward 0 [Pa] from the time T4.

In the example shown in FIG. 3, if the rotation speed maintaining control is not performed, the rotation speed of the engine 11 falls below the rotation speed N1 after the time T3 and directly decreases toward 0 [rpm], as shown by a thick broken line in FIG. 3. Therefore, after the time T3, the supply of the hydraulic pressure P1 to the transmission TM cannot be maintained by the line pressure of the mechanical hydraulic pressure supply device 15A. As a result, the transmission clutches of the transmission TM are in the released state, and the power transmission path from the engine 11 to the drive wheel DW is disconnected. In such a state, when the acceleration command is given to the vehicle 1, it takes time to connect the clutch of the transmission TM again, and as a result, response performance of the vehicle 1 to the acceleration command may decrease.

Although an example in which the fuel cut-off control is executed based on accelerator-OFF as the deceleration command given to the vehicle 1 has been described in the operation example described here, the present invention is not limited thereto. For example, the fuel cut-off control may be executed based on brake-ON instead of the accelerator-OFF or brake-ON after the accelerator-OFF.

Second Example

Next, a second example of the operation of the vehicle 1 will be described with reference to FIG. 4. The second example is an example of a case where the acceleration command is given to the vehicle 1 when the rotation speed of the engine 11 is maintained at the rotation speed N1 by the rotation speed maintaining control. In the following description of FIG. 4, the same components as those in FIG. 3 are denoted by the same reference numerals, and description thereof will be omitted as appropriate.

Figure 4:
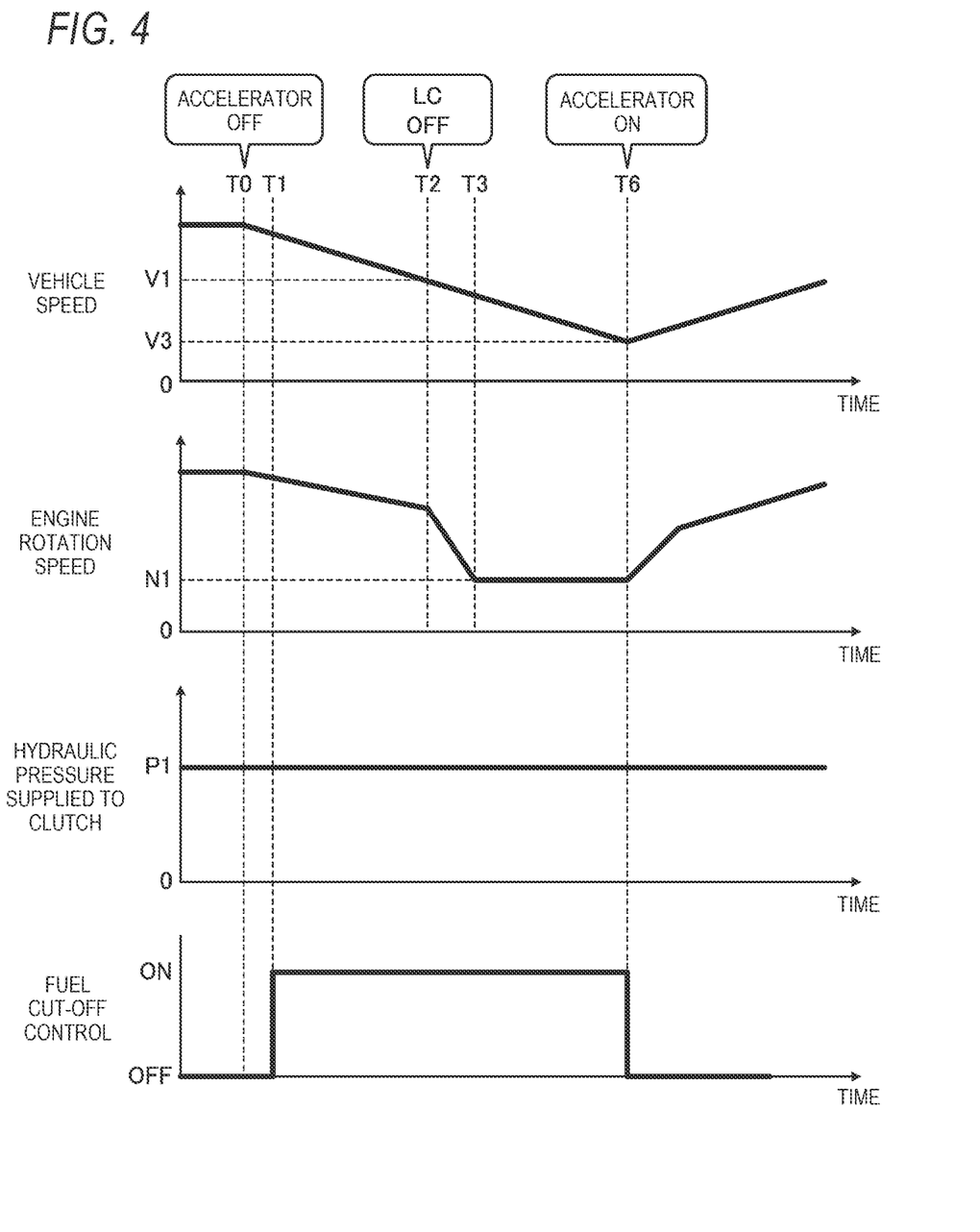
FIG. 4 is a timing chart showing a second example of the operation of the vehicle according to the embodiment of the present invention.

As shown in FIG. 4, it is assumed that the accelerator is ON at a time T6 when the rotation speed of the engine 11 is maintained at the rotation speed N1 by the rotation speed maintaining control, that is, at the time T6 when the vehicle speed is a speed V3 (speed V3>speed V2) before reaching the speed V2 (see FIG. 3).

When the control device 22 detects that the accelerator is ON based on the information from the accelerator pedal sensor, the control device 22 ends the fuel cut-off control and restarts the fuel supply to the engine 11. In addition, the control device 22 ends the rotation speed maintaining control along with the end of the fuel cut-off control.

At the time T6, the rotation speed of the engine 11 is the rotation speed N1, and the mechanical hydraulic pressure supply device 15A is in a state where the supply of the hydraulic pressure P1, which is necessary for bringing the clutch of the transmission TM into the engaged state, to the transmission TM can be maintained. Therefore, as the accelerator is ON, the rotation speed of the engine 11 increases without delay, and power of the engine 11 is transmitted to the drive wheel DW to increase the vehicle speed.

As described above, in the vehicle 1, the rotation speed of the engine 11 is maintained at the rotation speed N1 by the motor generator 12 due to rotation speed instruction control until the vehicle speed reaches the speed V2, and the mechanical hydraulic pressure supply device 15A is in the state where the necessary hydraulic pressure can be appropriately supplied to the transmission TM. Therefore, when the acceleration command is given to the vehicle 1 until immediately before the vehicle 1 stops, smooth acceleration can be achieved with little delay in response to the acceleration command.

Third Example

Next, a third example of the operation of the vehicle 1 will be described with reference to FIG. 5. The third example is an example of a case where the acceleration command is given to the vehicle 1 after the vehicle 1 stops. In the following description of FIG. 5, the same components as those in FIG. 3 are denoted by the same reference numerals, and description thereof will be omitted as appropriate.

Figure 5:
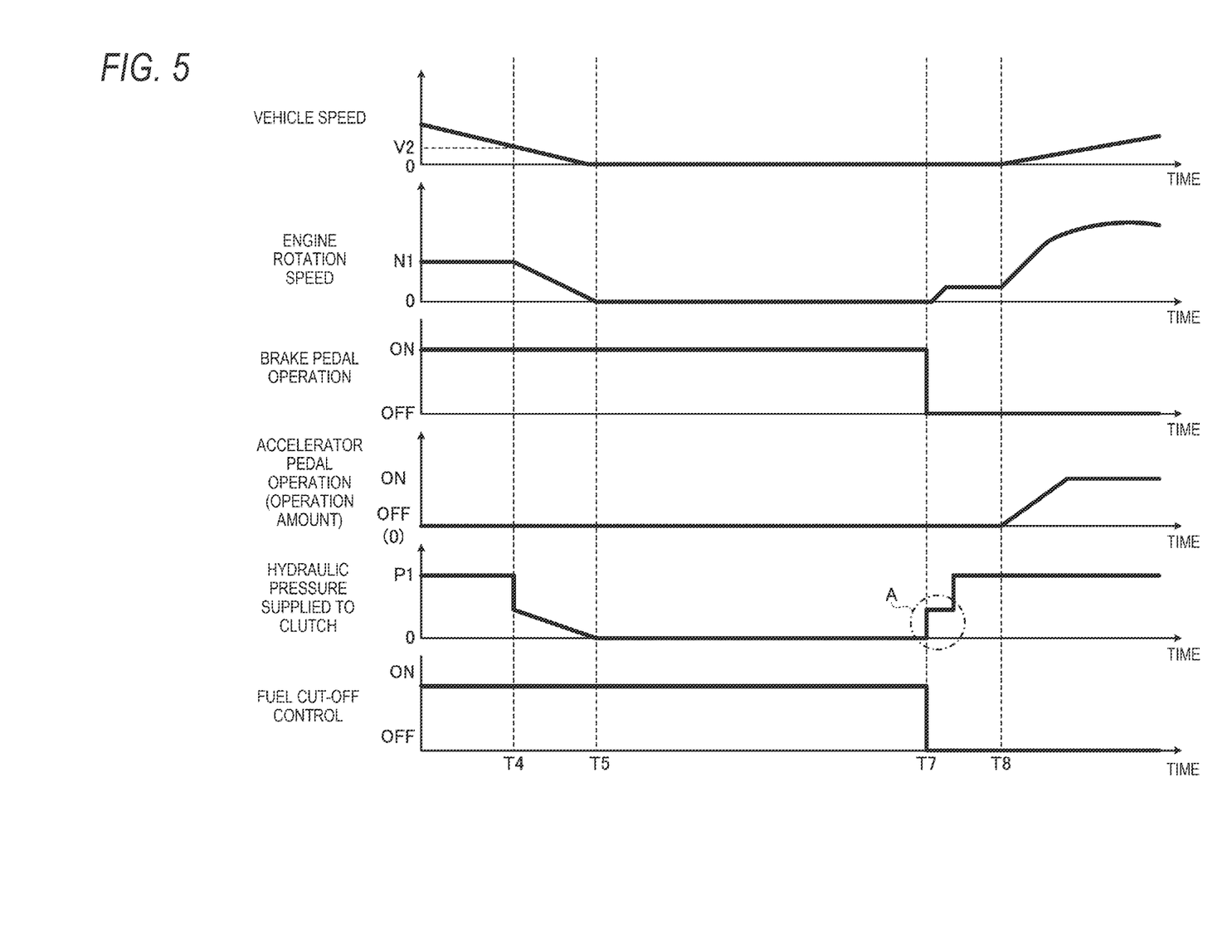
FIG. 5 is a timing chart showing a third example of the operation of the vehicle according to the embodiment of the present invention.

As shown in FIG. 5, at the time T4, the vehicle speed of the vehicle 1, which is decelerating in a state where the brake is ON and the accelerator is OFF, decreases to the speed V2, and thus the rotation speed maintaining control (for example, the rotational driving of the engine 11 driven by the motor generator 12) is ended. As a result, the rotation speed of the engine 11 decreases toward 0 [rpm] from the time T4, and becomes 0 [rpm] at the time T5.

When the rotation speed of the engine 11 falls below the rotation speed N1, the hydraulic pressure supplied to the transmission TM by the mechanical hydraulic pressure supply device 15A also decreases. As a result, the hydraulic pressure supplied to the transmission TM also decreases toward 0 [Pa] from the time T4. The vehicle 1 is stopped substantially at the same time as the time T5 (that is, the vehicle speed is 0 [km/h]).

It is assumed that the brake is OFF at a time T7 after the vehicle 1 stops. When brake-OFF is detected based on the information from the brake pedal sensor, the control device 22 ends (turns off) the fuel cut-off control and restarts the fuel supply to the engine 11. As a result, the engine 11 starts to be driven to rotate.

However, since the rotation of the engine 11 is stopped from the time T5 to the time T7, the mechanical hydraulic pressure supply device 15A is not driven at the time T7, and the hydraulic pressure cannot be supplied to the transmission TM by the mechanical hydraulic pressure supply device 15A. Therefore, the control device 22 notifies the hydraulic pressure control device 16 of the acceleration command given to the vehicle 1, thereby controlling the hydraulic pressure control device 16 to supply the hydraulic pressure accumulated in the pressure accumulator 15B to the transmission TM. As a result, as indicated by reference numeral A in FIG. 5, the hydraulic pressure supplied to the transmission TM can be rapidly increased by using the hydraulic pressure accumulated in the pressure accumulator 15B before the rotation speed of the engine 11 increases and before the mechanical hydraulic pressure supply device 15A enters the state where the necessary hydraulic pressure can be supplied to the transmission TM.

The hydraulic pressure supplied to the transmission TM is increased by the pressure accumulator 15B in a short period of, for example, about 0.5 [sec]. During this time, the rotation speed of the engine 11 increases, and the mechanical hydraulic pressure supply device 15A enters the state where the necessary hydraulic pressure can be appropriately supplied to the transmission TM. Therefore, the hydraulic pressure supplied to the transmission TM can be quickly increased to the hydraulic pressure P1, and for example, when the accelerator is ON at a time T8 immediately after the time T7, the power of the engine 11 is transmitted to the drive wheel DW without delay, and smooth acceleration (start) can be achieved with little delay in response to the acceleration command.

As described above, when the vehicle 1 and the engine 11 are stopped and the hydraulic pressure cannot be appropriately supplied from the mechanical hydraulic pressure supply device 15A to the transmission TM, the hydraulic pressure supplied to the transmission TM can be rapidly increased by supplying the hydraulic pressure to the transmission TM by the pressure accumulator 15B, so that excellent acceleration (start) can be achieved with little delay in response to the acceleration command given to the vehicle 1.

Although an example in which the hydraulic pressure is supplied from the pressure accumulator 15B to the transmission TM based on brake-OFF as the acceleration command given to the vehicle 1 has been described in the operation example described here, the present invention is not limited thereto. For example, the hydraulic pressure may be supplied from the pressure accumulator 15B to the transmission TM based on accelerator-ON instead of brake-OFF.

Fourth Example

Next, a fourth example of the operation of the vehicle 1 will be described with reference to FIG. 6. In the following description of FIG. 6, the same components as those in FIG. 3 are denoted by the same reference numerals, and description thereof will be omitted as appropriate. In addition, in FIG. 6, a solid line denoted by reference numeral NE indicates the rotation speed of the engine 11 (also refer to an arrow denoted by NE in FIG. 2), and a broken line denoted by reference numeral NM indicates rotation speed of the input shaft 141 of the gearbox 14 (also refer to an arrow denoted by NM in FIG. 2).

Figure 6:
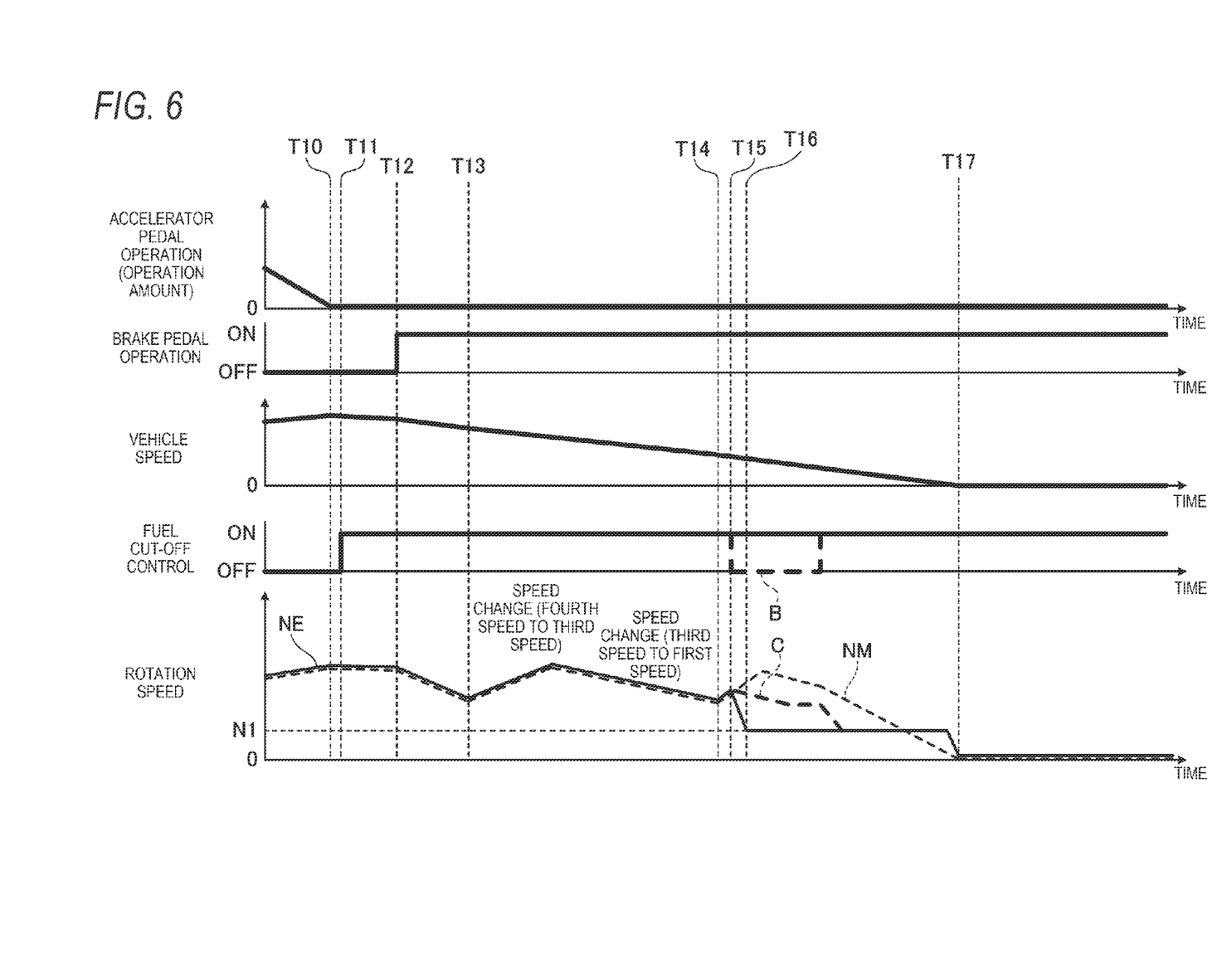
FIG. 6 is a timing chart showing a fourth example of the operation of the vehicle according to the embodiment of the present invention.

As shown in FIG. 6, it is assumed that any one of the transmission clutches and the lock-up clutch 134 of the transmission TM is in the engaged state, and the accelerator is turned off at a time T10 when the vehicle 1 is traveling (that is, vehicle speed>0). Then, it is assumed that a predetermined execution condition of the fuel cut-off control is satisfied at a time T11 after the time T10. In this case, the control device 22 starts the fuel cut-off control from the time T11. At this time, it is assumed that the gear stage of the gearbox 14 is, for example, a fourth speed.

It is assumed that the brake is ON at a time T12 after the time T11. By turning on the brake in addition to turning off the accelerator, the vehicle speed is further decreased from the time T12. In addition, at this time, since the lock-up clutch 134 is in the engaged state, the rotation speed of the engine 11 and the rotation speed of the input shaft 141 of the gearbox 14 further decrease as the vehicle speed is decreased.

When the vehicle speed decreases while the lock-up clutch 134 is in the engaged state, the rotation speed of the engine 11 may also decrease accordingly. However, the control device 22 can lower the gear stage of the gearbox 14 and thus increase the rotation speed of the engine 11 and the rotation speed of the input shaft 141 of the gearbox 14 to a rotation speed corresponding to the vehicle speed and the gear stage (transmission ratio) by the power from the side of the drive wheel DW. In the example shown in FIG. 6, the control device 22 changes the gear stage of the gearbox 14 from the fourth speed to a third speed at a time T13. Accordingly, the rotation speed of the engine 11 and the rotation speed of the input shaft 141 of the gearbox 14 temporarily increase from the time T13.

At a time T14 when the vehicle speed further decreases, the control device 22 changes the gear stage of the gearbox 14 from the third speed to a first speed this time. Accordingly, the rotation speed of the engine 11 and the rotation speed of the input shaft 141 of the gearbox 14 increase again from the time T14. Then, when the vehicle speed further decreases after the gear stage is set to the first speed (that is, after the gear stage is lowered) in this way, the control device 22 brings the lock-up clutch 134 into the released state. As a result, occurrence of the engine stall can be prevented.

In the example shown in FIG. 6, the control device 22 brings the lock-up clutch 134 into the released state at a time T15. However, at this time, since the rotation speed of the engine 11 is equal to or higher than the rotation speed N1, the above-described hydraulic pressure P1 is obtained as the hydraulic pressure that can be supplied to the transmission TM by the line pressure. Therefore, at this time, the hydraulic pressure P1 can be supplied to the transmission TM by the line pressure as necessary.

When the lock-up clutch 134 is in the released state, the power from the side of the drive wheel DW is transmitted to the gearbox 14, but is not transmitted to the engine 11. Therefore, as shown in FIG. 6, the rotation speed of the input shaft 141 of the gearbox 14 temporarily increases even after the time T15 along with the change to the first speed, while the rotation speed of the engine 11 decreases from the time T15. That is, the rotation speed of the input shaft 141 of the gearbox 14 and the rotation speed of the engine 11 deviate from each other. If nothing is performed in this state, the rotation of the engine 11 is stopped.

Therefore, when the control device 22 detects that the rotation speed of the engine 11 has decreased to the rotation speed N1 based on the information from the rotation speed sensor after the lock-up clutch 134 is brought into the released state, the control device 22 executes the rotation speed maintaining control. In the example shown in FIG. 6, since the rotation speed of the engine 11 reaches the rotation speed N1 at a time T16 after the time T15, the control device 22 executes the rotation speed maintaining control from the time T16, and maintains the rotation speed of the engine 11 at the rotation speed N1 by rotational driving provided by the motor generator 12. As described above, the rotation speed maintaining control (that is, the rotational driving of the engine 11 driven by the motor generator 12) is ended when the vehicle speed reaches the speed V2 (not shown in FIG. 6), for example. Then, at a subsequent time T17, the vehicle 1 stops (that is, the vehicle speed=0).

In this way, the control device 22 continuously executes the fuel cut-off control from when the vehicle 1 reaches the predetermined speed V1 (speed V1>0) to when the vehicle 1 stops. Therefore, a period during which the fuel cut-off control is performed can be maximized, and thus fuel efficiency of the vehicle 1 can be improved.

On the other hand, as indicated by reference numeral B in FIG. 6, the control device 22 may temporarily stop the fuel cut-off control after the lock-up clutch 134 is brought into the released state, and supply fuel to the engine 11 to maintain the rotation speed of the engine 11. In this case, while the fuel is supplied to the engine 11, a decrease in the rotation speed of the engine 11 can be prevented even if the engine 11 is not rotationally driven by the motor generator 12. As a result, a period in which the motor generator 12 rotationally drives the engine 11 can be shortened, and thus it is possible to reduce electric power consumed by the motor generator 12.

As described above, according to the vehicle 1 of the present embodiment, when the acceleration command is given to the vehicle 1, if the hydraulic pressure supplied to the transmission TM by the mechanical hydraulic pressure supply device 15A is less than the hydraulic pressure necessary for connecting the power transmission path, the hydraulic pressure can be rapidly supplied to the transmission TM by the pressure accumulator 15B. Therefore, even when the rotation speed maintaining control (maintenance of the rotation speed N1 of the engine 11) executed along with the start of the fuel cut-off control is ended when the vehicle speed is equal to or lower than the speed V2, excellent response performance to the acceleration command can be maintained by the hydraulic pressure supplied by the pressure accumulator 15B. Therefore, with a simple configuration using the pressure accumulator 15B, electric power consumed in the vehicle 1 can be reduced while maintaining excellent response performance to the acceleration command.

Since the rotation speed of the engine 11 is maintained at the rotation speed N1 by the motor generator 12 until the vehicle speed reaches the speed V2, that is, until immediately before the vehicle 1 stops, excellent responsiveness to the acceleration command can be maintained for a long time.

(Modification)

In the example described above, as shown in FIG. 2, when the rotation speed of the engine 11 decreases due to the execution of the fuel cut-off control, the control device 22 executes the rotation speed maintaining control (for example, rotationally drives the engine 11 by the motor generator 12) so as to maintain the rotation speed of the engine 11 at the rotation speed N1 from when the decreased rotation speed reaches the rotation speed N1 (for example, the time T3) to when the vehicle speed becomes equal to or lower than the speed V2 (for example, the time T4). However, the present invention is not limited thereto.

For example, the control device 22 may maintain the rotation speed of the engine 11 at the rotation speed N1 by executing the rotation speed maintaining control from when the decreased rotation speed of the engine 11 reaches the rotation speed N1 (for example, the time T3) to when the acceleration command is given to the vehicle 1. The acceleration command includes, for example, operations such as accelerator-ON and brake-OFF. In this way, since the rotation speed of the engine 11 can be maintained at the rotation speed N1 until the acceleration command is given to the vehicle 1, the necessary hydraulic pressure (for example, the hydraulic pressure P1) can be supplied from the mechanical hydraulic pressure supply device 15A to the transmission TM regardless of the decrease in the vehicle speed (for example, even after the vehicle 1 stops), and thus excellent response performance can be maintained.

In addition, for example, the control device 22 may maintain the rotation speed of the engine 11 at the rotation speed N1 by executing the rotation speed maintaining control from when the decreased rotation speed of the engine 11 reaches the rotation speed N1 (for example, the time T3) to when a predetermined period (for example, 5 [sec]) elapses. In this way, it is possible to prevent an increase in electric power consumption due to a long-term continuous operation of the motor generator 12 as an electric motor.

In addition, for example, the control device 22 may maintain the rotation speed of the engine 11 at the rotation speed N1 by executing the rotation speed maintaining control from when the decreased rotation speed of the engine 11 reaches the rotation speed N1 (for example, the time T3) to when a remaining capacity of the battery 17 is equal to or less than a threshold value. When the rotation speed of the engine 11 is maintained by the motor generator 12, the electric power of the battery 17 is used. In this case, the control device 22 recognizes the remaining capacity of the battery 17 based on information input from the battery sensor, and maintains the rotation speed of the engine 11 using the electric power of the battery 17 when the remaining capacity of the battery 17 is larger than the threshold value. In this way, since the electric power of the battery 17 is not used when the remaining capacity of the battery 17 is equal to or less than the threshold value, the battery 17 can be prevented from being overdischarged.

If the accumulated pressure of the pressure accumulator 15B is supplied to the transmission TM, the clutch of the transmission TM can be brought into the engaged state. Therefore, even when the vehicle 1 is traveling (that is, when the vehicle speed>0) without executing the rotation speed maintaining control described above, it is conceivable that the accumulated pressure of the pressure accumulator 15B is appropriately supplied to the transmission TM, and thus the clutch of the transmission TM is brought into the engaged state. However, in this case, when the clutch of the transmission TM is brought into the engaged state, there is a possibility that an excessive shock occurs, which may lead to a decrease in marketability of the vehicle 1.

Specifically, in a clutch that connects and disconnects between one side and the other side, a shock (torque fluctuation) does not occur even when the clutch is rapidly engaged (hereinafter, also referred to as the sudden engagement) as long as a rotation speed of the one side and a rotation speed of the other side are the same. On the other hand, the shock occurs if the sudden engagement occurs when there is a difference between the rotation speed of the one side and the rotation speed of the other side.

If the vehicle 1 is stopped and the engine 11 is also stopped, the rotation speed of the engine 11, the rotation speed of the input shaft 141, and a rotation speed of the output member 144 are all zero. Therefore, when the vehicle 1 is stopped and the engine 11 is also stopped, even if the accumulated pressure of the pressure accumulator 15B is supplied to the transmission TM and the clutch of the transmission TM is suddenly engaged as indicated by reference numeral A in FIG. 5, an excessive shock that may lead to a decrease in the marketability of the vehicle 1 does not occur.

On the other hand, when the vehicle 1 is traveling (that is, the vehicle speed>0) and the engine 11 is stopped, if the clutch of the transmission TM is in the released state, in most cases, a difference occurs between the rotation speed of the engine 11, the rotation speed of the input shaft 141, and the rotation speed of the output member 144. Therefore, in such cases, if the accumulated pressure of the pressure accumulator 15B is supplied to the transmission TM to suddenly engage the clutch of the transmission TM, an excessive shock may occur, which may lead to a decrease in the marketability of the vehicle 1. Therefore, according to the control device 22, as described above, only w % ben the vehicle 1 and the engine 11 are stopped, the accumulated pressure of the pressure accumulator 15B is supplied to the transmission TM to engage the clutch of the transmission TM. Therefore, occurrence of the excessive shock that may lead to the decrease in the marketability of the vehicle 1 is avoided.

Although the embodiment of the present invention has been described above, the present invention is not limited to the above-described embodiment, and modifications, improvements, and the like can be made as appropriate.

At least the following matters are described in the present specification. Although corresponding constituent elements and the like in the above-described embodiment are shown in parentheses, the present invention is not limited thereto.

(1) A vehicle (vehicle 1) includes:
an internal combustion engine (engine 11);
a rotary electric machine (motor generator 12) configured to rotationally drive the internal combustion engine;
a connection-disconnection device (lock-up clutch 134, first transmission clutch 142a, second transmission clutch 143a) provided to connect and disconnect a power transmission path between the internal combustion engine and a drive wheel (drive wheel DW), the connection-disconnection device being configured to connect the power transmission path in response to supply of hydraulic pressure equal to or higher than a predetermined value;
a hydraulic pressure supply device (hydraulic pressure supply device 15) configured to supply hydraulic pressure to the connection-disconnection device;
a hydraulic pressure control device (hydraulic pressure control device 16) configured to control the supply of the hydraulic pressure supplied by the hydraulic pressure supply device to the connection-disconnection device; and
a control device (control device 22) configured to control the internal combustion engine and the rotary electric machine,
in which the hydraulic pressure supply device includes:
a mechanical hydraulic pressure supply device (mechanical hydraulic pressure supply device 15A) that is driven in accordance with rotation of the internal combustion engine to supply the hydraulic pressure to the connection-disconnection device; and
a pressure accumulator (pressure accumulator 15B) configured to supply the hydraulic pressure to the connection-disconnection device by pressure accumulated in advance,
the control device
executes fuel cut-off control to stop fuel supply to the internal combustion engine based on a deceleration command given to the vehicle, and
executes rotation speed maintaining control to maintain a rotation speed of the internal combustion engine at a predetermined rotation speed larger than 0 by rotationally driving the internal combustion engine by the rotary electric machine or supplying fuel to the internal combustion engine when the rotation speed of the internal combustion engine decreases to a predetermined rotation speed along with the execution of the fuel cut-off control, and
the hydraulic pressure control device
supplies the hydraulic pressure to the connection-disconnection device by the pressure accumulator if the hydraulic pressure supplied to the connection-disconnection device by the mechanical hydraulic pressure supply device is less than the predetermined value when an acceleration command is given to the vehicle.

According to (1), the hydraulic pressure can be quickly supplied to the connection-disconnection device by the pressure accumulator if the hydraulic pressure supplied to the connection-disconnection device by the mechanical hydraulic pressure supply device is less than the predetermined value when the acceleration command is given to the vehicle, and thus it is possible to prevent a decrease in response performance to the acceleration command by a simple configuration using the pressure accumulator.

(2) The vehicle according to (1),
in which the control device executes the rotation speed maintaining control from when the rotation speed of the internal combustion engine decreases to the predetermined rotation speed to when a speed of the vehicle becomes equal to or less than a threshold value.

According to (2), since the rotation speed of the internal combustion engine is maintained at the predetermined rotation speed until the speed of the vehicle becomes equal to or less than the threshold value, excellent responsiveness to the acceleration command can be maintained for a long time.

(3) The vehicle according to (1),
in which the control device executes the rotation speed maintaining control from when the rotation speed of the internal combustion engine decreases to the predetermined rotation speed to when the acceleration command is given to the vehicle.

According to (3), by maintaining the rotation speed of the engine at the predetermined rotation speed until the acceleration command is given to the vehicle, excellent responsiveness to the acceleration command can be maintained regardless of any decrease in the vehicle speed, for example, even when the vehicle is in a stopped state.

(4) The vehicle according to (1),
in which the control device executes the rotation speed maintaining control from when the rotation speed of the internal combustion engine decreases to the predetermined rotation speed to when a predetermined period elapses.

According to (4), since the rotation speed maintaining control can be ended when the predetermined period has elapsed since the rotation speed of the internal combustion engine decreases to the predetermined rotation speed, an increase in electric power consumption of the rotary electric machine and deterioration in fuel efficiency caused by long-term execution of the rotation speed maintaining control can be prevented.

(5) The vehicle according to (1),
in which the rotary electric machine rotationally drives the internal combustion engine by electric power supplied from a battery (battery 17) of the vehicle, and
the control device executes the rotation speed maintaining control from when the rotation speed of the internal combustion engine decreases to the predetermined rotation speed to when the battery is in a predetermined state.

According to (5), for example, when a remaining capacity of the battery is equal to or less than a threshold value, the eclectic power of the battery is not used as electric power for rotationally driving the internal combustion engine, so that the battery can be prevented from being overdischarged.

(6) The vehicle according to any one of (1) to (5),
in which the control device continuously executes the fuel cut-off control from when the vehicle reaches a predetermined speed to when the vehicle stops.

According to (6), a period during which the fuel cut-off control is performed can be maximized, and thus the fuel efficiency of the vehicle can be improved.

The invention claimed is:
1. A vehicle comprising:
an internal combustion engine;
a rotary electric machine configured to rotationally drive the internal combustion engine;
a connection-disconnection device provided to connect and disconnect a power transmission path between the internal combustion engine and a drive wheel, the connection-disconnection device being configured to connect the power transmission path in response to supply of hydraulic pressure equal to or higher than a predetermined value;
a hydraulic pressure supply device configured to supply hydraulic pressure to the connection-disconnection device;
a hydraulic pressure control device configured to control the supply of the hydraulic pressure supplied by the hydraulic pressure supply device to the connection-disconnection device; and
a control device configured to control the internal combustion engine and the rotary electric machine, wherein:
the hydraulic pressure supply device includes:
a mechanical hydraulic pressure supply device that is driven in accordance with rotation of the internal combustion engine to supply the hydraulic pressure to the connection-disconnection device; and
a pressure accumulator configured to supply the hydraulic pressure to the connection-disconnection device by pressure accumulated in advance;

the control device executes:
fuel cut-off control to stop fuel supply to the internal combustion engine based on a deceleration command given to the vehicle;
rotation speed maintaining control to maintain a rotation speed of the internal combustion engine at a predetermined rotation speed larger than 0 by rotationally driving the internal combustion engine by the rotary electric machine or supplying fuel to the internal combustion engine when the rotation speed of the internal combustion engine decreases to a predetermined rotation speed along with the execution of the fuel cut-off control; and
the rotation speed maintaining control, at any timing from when the rotation speed of the internal combustion engine decreases to the predetermined rotation speed to when a speed of the vehicle becomes equal to or less than a threshold value, from when the rotation speed of the internal combustion engine decreases to the predetermined rotation speed to when an acceleration command is given to the vehicle, or from when the rotation speed of the internal combustion engine decreases to the predetermined rotation speed to when a predetermined period elapses; and
the hydraulic pressure control device supplies the hydraulic pressure to the connection-disconnection device by the pressure accumulator when the hydraulic pressure supplied to the connection-disconnection device by the mechanical hydraulic pressure supply device is less than the predetermined value when the acceleration command is given to the vehicle.

2. The vehicle according to claim 1, wherein
the control device executes the rotation speed maintaining control from when the rotation speed of the internal combustion engine decreases to the predetermined rotation speed to when the speed of the vehicle becomes equal to or less than the threshold value.

3. The vehicle according to claim 1, wherein
the control device executes the rotation speed maintaining control from when the rotation speed of the internal combustion engine decreases to the predetermined rotation speed to when the acceleration command is given to the vehicle.

4. The vehicle according to claim 1, wherein
the control device executes the rotation speed maintaining control from when the rotation speed of the internal combustion engine decreases to the predetermined rotation speed to when the predetermined period elapses.

5. The vehicle according to claim 1, wherein:
the rotary electric machine rotationally drives the internal combustion engine by electric power supplied from a battery of the vehicle; and
the control device executes the rotation speed maintaining control from when the rotation speed of the internal combustion engine decreases to the predetermined rotation speed to when the battery is in a predetermined state.

6. The vehicle according to claim 1, wherein
the control device continuously executes the fuel cut-off control from when the vehicle reaches a predetermined speed to when the vehicle stops.

* * * * *